United States Patent [19]

Kudoh

[11] Patent Number: 5,678,050
[45] Date of Patent: Oct. 14, 1997

[54] PORTABLE INFORMATION PROCESSING SYSTEM UTILIZING A WIRELESS SELECTIVE CALL RECEIVER

[75] Inventor: Kazuhiro Kudoh, Tokyo, Japan

[73] Assignee: NEC Corporation, Tokyo, Japan

[21] Appl. No.: 475,297

[22] Filed: Jun. 7, 1995

[30] Foreign Application Priority Data

Jun. 27, 1994 [JP] Japan ................................. 6-144942

[51] Int. Cl.⁶ .................................................. G06F 1/30
[52] U.S. Cl. ................................................... 395/750
[58] Field of Search ........................................ 395/750

[56] References Cited

U.S. PATENT DOCUMENTS

| | | | |
|---|---|---|---|
| 4,868,832 | 9/1989 | Marrington et al. | 395/750 |
| 5,163,124 | 11/1992 | Yabe et al. | 395/750 |
| 5,430,883 | 7/1995 | Horiuchi | 395/750 |
| 5,438,678 | 8/1995 | Smith | 395/750 |
| 5,475,271 | 12/1995 | Shibasaki et al. | 395/750 |
| 5,557,738 | 9/1996 | Townsley et al. | 395/750 |

*Primary Examiner*—Jack B. Harvey
*Assistant Examiner*—David A. Wiley
*Attorney, Agent, or Firm*—Sughrue, Mion, Zinn, Macpeak & Seas, PLLC

[57] ABSTRACT

When a primary battery voltage detector of a the wireless selective call receiver detects the voltage drop of a primary batter, it transmits a voltage drop signal to a CPU. The CPU receives the voltage drop signal to transmit an alarm data to a control section of an information processing apparatus through an I/F circuit. The control section control a display section to display an alarm message and an speaker drive circuit such that an alarm sound is outputted from a speaker. Further, the CPU controls a power supply control circuit to connect a power supply of the information processing apparatus to the wireless selective call receiver without any instantaneous power down so that the selective call receiver can continuously receive an information and/or a program.

18 Claims, 3 Drawing Sheets

5,678,050

PORTABLE INFORMATION PROCESSING SYSTEM UTILIZING A WIRELESS SELECTIVE CALL RECEIVER

BACKGROUND OF THE INVENTION

1. Field of the Invention

The present invention relates to an information processing system, more particularly, to a portable information processing system including a portable information processing apparatus and a pocketable wireless selective call receiver coupled thereto to receive information.

2. Description of Related Art

Recently, there has been widely used a portable information processing system. In such a system, there is a case that a portable information processing apparatus such a notebook type of personal computer is connected to a small card device such as an IC card to take in and store information from the small card therein. With the taking in of information, it would be desired that a wireless selective call receiver such as a pager receiver is connected to the portable information processing apparatus. The selective call receiver has at least one identifier and called using the identifier to receive information. The received information would be transferred to the information processing apparatus.

In such a portable information processing system, it is required that the wireless selective call receiver can always receive the information with a good efficiency regardless of the operation state of the information processing apparatus. However, the information processing apparatus does not have sufficient margin in power because it is of a portable type itself. In addition, it is desirable that the wireless selective call receiver can be used alone in a case where the selective call receiver is disconnected from the information processing apparatus to be carried alone. For these purposes, the wireless selective call receiver needs to have a power supply such as a primary battery independent of the power supply of the information processing apparatus and to use the primary batter as the power supply even in a state in which it is connected to the information processing apparatus.

The conventional wireless selective call receiver has a function to inform the voltage drop of the primary battery as the power supply built in the selective call receiver. When the voltage of the primary battery drops to a predetermined level or below, it is informed to a user with a display or sound on or from the selective call receiver. Therefore, the user could replace the primary battery with a new one based on the information. However, in a case that the selective call receiver is connected to the information processing apparatus, even if the information indicative of the voltage drop of the built-in battery is provided to the user from the selective call receiver, there is a case that the user cannot be aware of the information because the user has the attention caught by the operation of the information processing apparatus. If the battery is not replaced after the information indicative of the voltage drop of the battery is provided, there are cases that the selective call receiver cannot receive any information so that it loses a chance to receive the information.

As described above, however, the portable information processing apparatus does not have sufficient power supply capability and the selective call receiver or pager receiver consumes much power. Therefore, there would be the need for a new power supply system in an information processing system using a wireless selective call receiver which is connected to an information processing apparatus.

With the power supply, there is an example of a power supply method between a main body section with a power supply and a portable terminal which can be connected to the main body section and has a battery separated from the main body section. The example is disclosed in Japanese Laid Open Patent Disclosure (JP-A-Sho61-218326) in which power is always supplied from the main body section to the portable terminal to prevent the portable terminal from consuming the power of the battery in the portable terminal when the portable terminal is connected to the main body section. As another example of power supply method in a case that a peripheral unit is connected to the main body section of a computer, there is proposed a system disclosed in Japanese Laid Open Patent Disclosure (JP-B2-Hei1-23803) in which the power is supplied from a power supply of the peripheral unit to the main body section of the computer and voltage regulated power which is obtained in the main body section of the computer is supplied to a predetermined portion of circuits of the peripheral unit. However, the above technique cannot be applied to the portable information processing system.

SUMMARY OF THE INVENTION

Therefore, the present invention has, as an object, to provide an information processing system in which a selective call receiver is connected to an information processing apparatus and an information can be reliably received by the selective call receiver and transferred to the information processing apparatus.

Another object of the present invention is to provide a selective call receiver which can use a power supply built therein and has a terminal for receiving power from an external unit when the output voltage of the power supply drops.

Still another object of the present invention is to provide an information processing system in which a selective call receiver having a power supply is connected to an information processing apparatus having another power supply and the power source for the selective call receiver can be switched from the power supply of the selective call receiver to the power supply of the information processing apparatus without any instantaneous power down.

In order to achieve an aspect of the present invention, a portable information processing system includes a portable information processing apparatus for processing or operating based on an information transferred thereto, including a first power supply unit for supplying a power for the information processing apparatus, and a portable selective call receiver connected to the information processing apparatus and disconnectable from the information processing apparatus, for receiving the information to transfer to the portable information processing apparatus, wherein the selective call receiver includes a second power supply unit for supplying a power for the receiver, and power supply switching means for supplying the power from the first power supply unit for the receiver in place of the second power supply unit when an output voltage of the second power supply unit drops.

In order to achieve another aspect of the present invention, there is provided a portable selective call receiver having a connector through which the receiver can be connected to an apparatus. The selective call receiver includes a power supply for supplying power for the receiver, a terminal for receiving an external power, and power supply switching means for supplying the external power via the terminal for the receiver in place of the power supply unit when an output voltage of the power supply unit drops.

The power supply switching means can automatically switch from the power supply built in the selective call receiver to the power supply of the information processing apparatus without any instantaneous power down when an output voltage of the power supply built-in the selective call receiver drops. Therefore, the selective call receiver can continuously receive information. In this case, the power supply switching means may be constituted of a first rectifying element having an anode coupled to the power supply of the selective call receiver, and a second rectifying element having an anode coupled to the power supply of the information processing apparatus or the terminal of connector and a cathode coupled to a cathode of the first rectifying element. As a result, when the voltage of the power supply built in the selective call apparatus drops to a voltage lower than the voltage of the power supply of the information processing apparatus, the power source is automatically switched. Or, the power supply switching means may be composed of detecting means for detecting that the output voltage of the power supply of the selective call receiver drops to a predetermined level, switching control means for generating a switching control signal when it is detected by the detecting means that the output voltage of the second power supply unit drops to the predetermined level, and switching means for switching from the second power supply to the first power supply for the receiver without any instantaneous power down in response to the switching control signal.

When the output voltage of the battery in the selective call receiver drops to a predetermined level, outputting means outputs an alarm data to the information processing apparatus which displays on a display unit or output to a sound output unit an information indicative of the voltage drop of the power supply built in the selective call receiver in response to the alarm data.

In the preferred embodiment, the information processing apparatus and the selective call receiver are connected to each other via a connector which is compatible with a pocketable small device such as an IC card. By this, the information processing apparatus can receive data or a program from the selective call receiver or the small device.

In order to achieve still another aspect of the present invention, in a portable information processing system in which an information processing apparatus and a portable wireless selective call receiver are connected and the information processing apparatus processes or operates based on an information received by the receiver, a method of switching power supply, includes the steps of:

detecting that the output voltage of a power supply unit built in the receiver drops to a predetermined level; and automatically switching from the power supply unit built in the receiver to another power supply unit built in the information processing apparatus for the receiver in response to the detection.

DESCRIPTION OF THE PREFERRED EMBODIMENTS

An information processing system according to the present invention will be described below with reference to the accompanying drawings.

Figure 1:
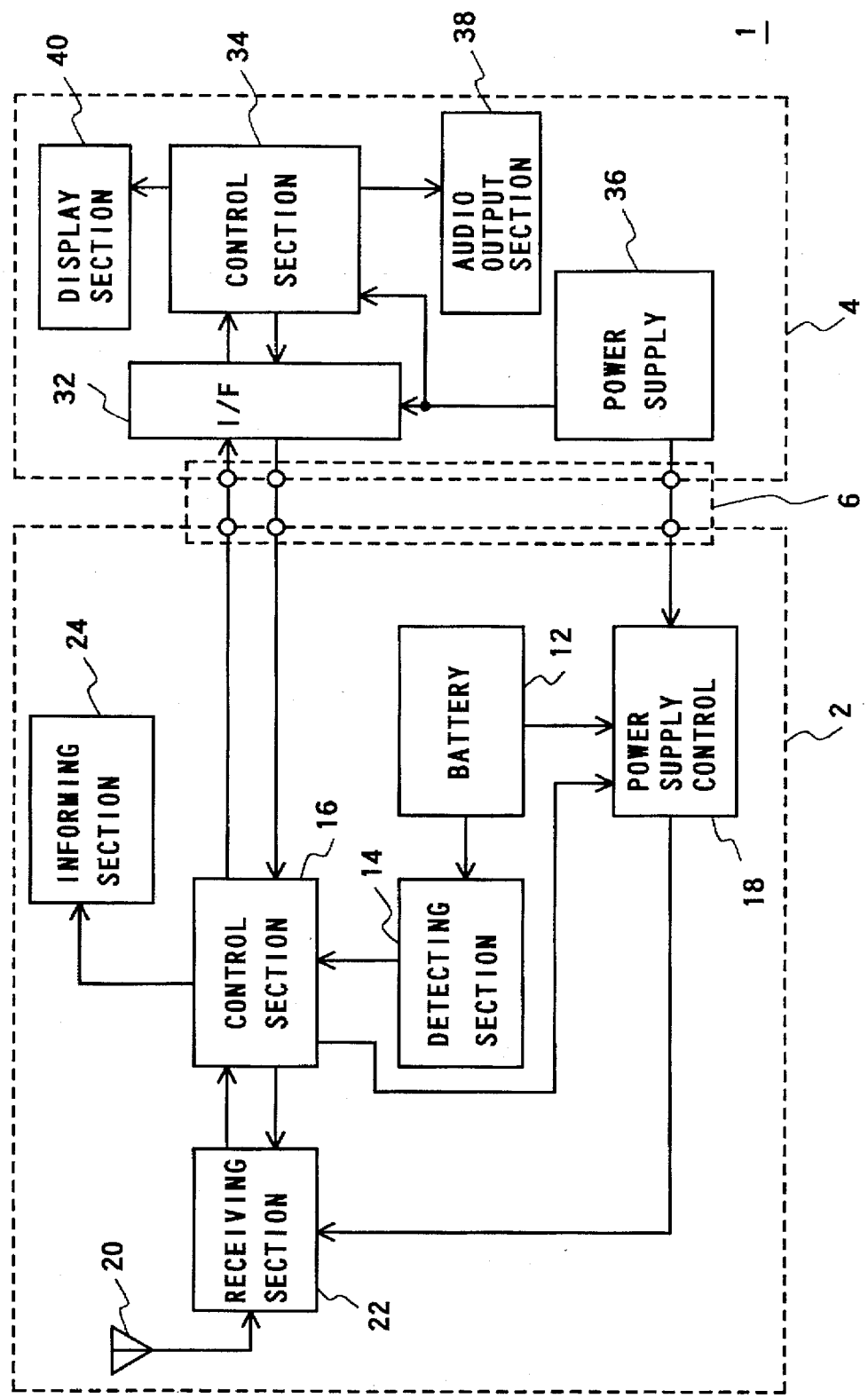
FIG. 1 is a block diagram showing an information processing system composed of a wireless selective call receiver and an information processing apparatus according to an embodiment of the present invention.

FIG. 1 is a block diagram showing the information processing system composed of a pocketable wireless selective call receiver 2 and a portable information processing apparatus 4 according to an embodiment of the present invention. Referring to FIG. 1, in an information processing system 1, the selective call receiver 2 is connected to the information processing apparatus 4 via a connector 6 and information is received by the selective call receiver and processed by the information processing apparatus. The selective call receiver 2 and the information processing apparatus 4 have different power supplies, respectively. Therefore, if being disconnected from each other, the selective call receive 2 and the information processing apparatus 4 may be used alone as a pager and a personal computer with no relation to each other in a usual manner, respectively. In this embodiment, the connector 6 has a pin arrangement compatible with that of another pocketable small card device such as an IC card which has no primary battery therein. Therefore, a user can connect such a small card to the information processing apparatus 4 via the connector 6 in place of the selective call receiver 2. In this case, the small card device can be supplied with the power from the power supply of the information processing apparatus 4.

The wireless selective call receiver 2 includes a primary battery 12, an antenna 20 for receiving a high frequency wireless signal, a receiving section 22 for extracting an information from the received signal, a detection section 14 for detecting the output voltage of the primary battery 12, an informing section 24 for informing the voltage drop of the primary battery 12, and a control section 16 for controlling the various sections. The power is usually supplied from the batter 12 built therein to various sections directly or through a power supply control circuit 18. The primary battery voltage detecting section 14 is connected to the primary battery 12 to monitor the output voltage of the primary battery 12 and outputs a signal to the control section 16 when the output voltage of the primary battery 12 drops to a predetermined level. The control section 16 outputs an alarm data to the information processing apparatus 4 via the connector 6. In addition, the power supply control circuit 18 is controlled in accordance with a control signal from the control section 16 such that the power is supplied from the information processing apparatus 4 to the various sections of the selective call receiver via the connector 6. As a result, even if the output voltage of the primary battery 12 drops, the operation of the receiving section 22 can be guaranteed. Further, the control section 16 may control the informing section 24 to inform the voltage drop of the primary battery 12.

The information processing apparatus 4 includes an interface (I/F) circuit 32 for interfacing the apparatus 4 with the selective call receiver 2, a power supply 36, a display section 40 for displaying a data, an audio output section 38 for outputting an audio sound, and a control section 34 for controlling the various sections of the apparatus 4. The power from the power supply 36 is supplied to all the sections in the information processing apparatus 4 and can be supplied to an external unit, for example, the selective call receiver 2 in this case, via the connector 6. When receiving the alarm data from the selective call receiver 2 through the interface circuit 32 via the connector 6, the control section 34 controls based on the alarm data the display section 40 to display an alarm message and the audio output section 38 to output an alarm sound.

In the wireless selective call receiver 2, the receiving section 22 is controlled by a control section 16 to input a high frequency signal received by an antenna 20 and amplifies and demodulates it to output to the control section 16 as a digital signal. The control section 16 extracts a information composed of an identifier and a data from the digital signal and compares the identifier of the received information with an identifier stored in the control section 16. When the coincidence cannot be obtained between both the identifiers, the information is abandoned. When both the identifiers are coincident with each other, the control section 16 transfers the data to the control section 34 of the information processing apparatus 4 through the interface (I/F) circuit 32 via the connector 6. The control section 34 has a ROM in which a program is stored and processes the data in accordance with the program. The processed result is displayed by the display section 40 and/or outputted from the audio output section 38, under the control of the control section 34. When detecting the voltage drop of the primary battery 12 while the high frequency signal is received, the detecting section 14 generates a voltage drop signal to output the control section 16. The control section 16 issues the control signal to the power supply control section 18 so that the power is supplied from the power supply 36 of the information processing apparatus 4 to the various sections of the selective call receiver 2 in place of the primary battery 12.

Next, the information processing system according to another embodiment of the present invention will be described below with reference to FIGS. 2 and 3. In this embodiment, a program is transmitted and stock price data and user scheduling data are processed, for example.

Figure 2:
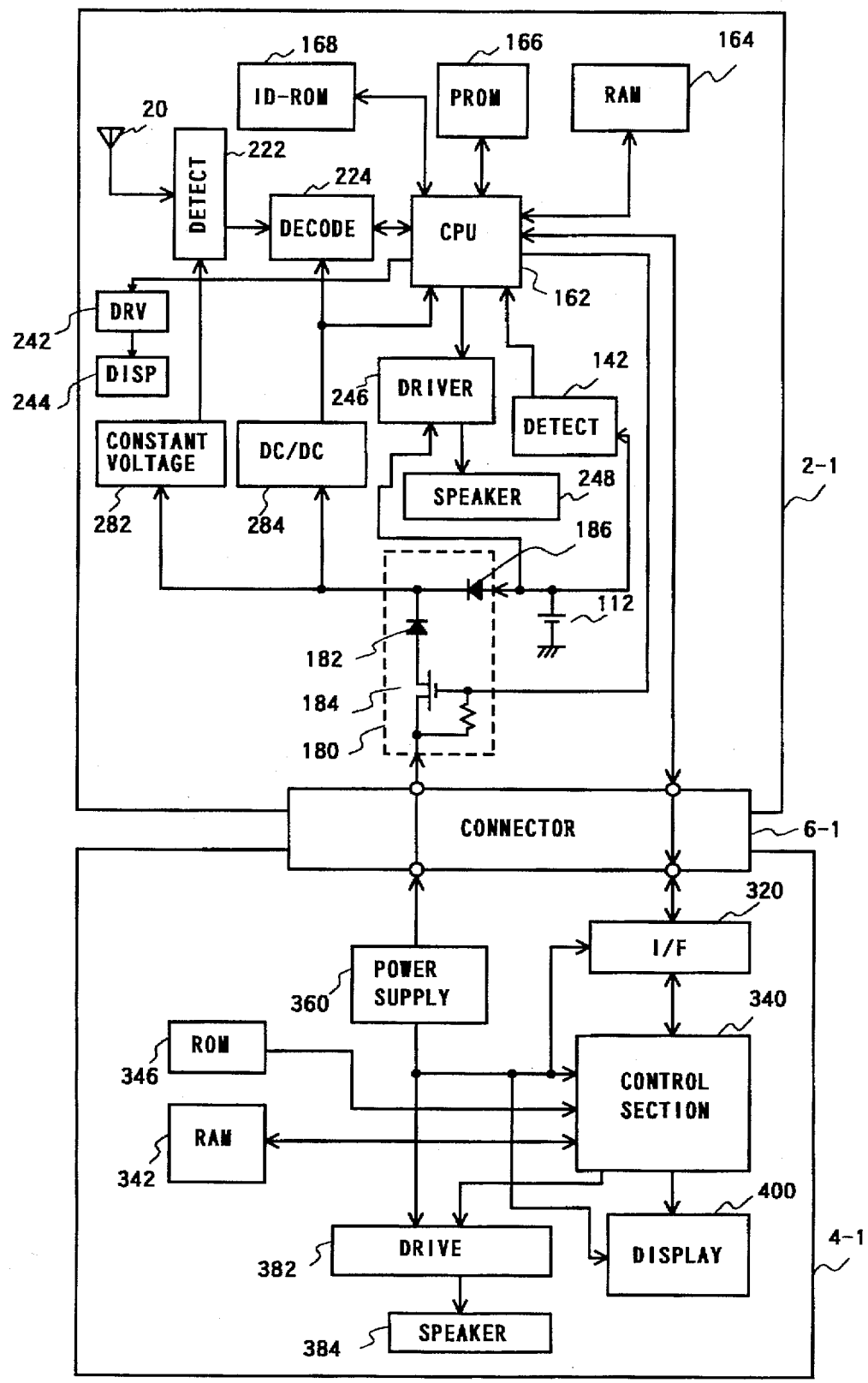
FIG. 2 is a block diagram showing a particular structure of an example of the information processing system shown in FIG. 1.

Referring to FIG. 2, a pocketable wireless selective call receiver 2-1 is connected to a portable information processing apparatus 4-1 via a connector 6-1. The connector 6-1 has a shape compatible with that of another small pocketable device such as an IC card. A user first connects the small device in which a program for processing stock price data is stored to the information processing apparatus 4-1 via the connector 6-1. Then a switch is turned on so that power is supplied from a power supply 360 of the apparatus 4-1 to various sections and circuits of the apparatus 4-1. That is, the power is supplied from a power supply 360 to a RAM 342, a ROM 346, a driver 382, a speaker 384, and a display unit 400 as well as the other circuits of the information processing apparatus 4-1 such as the I/F circuit 320. A control section 340 operates based on a program stored in the ROM 346 and, when a command is input from a keyboard (not shown), reads out a program stored in the small device to be stored in a RAM 342. Then the user disconnects the small device and connects the selective call receiver 2-1 to the information processing apparatus 4-1.

The selective call receiver 2-1 includes a primary battery 112. The power is usually supplied from the primary battery 112 (about 1.5 V) to a detector section 222 through a power supply control circuit 180 and a constant voltage circuit 282. Also, the power from the primary battery 112 is boosted up by a DC/DC converter 284 and supplied to various sections of the receiver 2-1 such as a decoder 224, a programmable read only memory (PROM) 166, a CPU 162, an identifier storing ROM (ID-ROM) 168, and a random access memory (RAM) 164, and further supplied to a speaker drive circuit 246 and a speaker 248 as well as a display unit 244 and a display drive circuit 242. The ID-ROM 168 stores a plurality of identifiers in this example. However, the ID-ROM 168 may store a single identifier. One of the plurality of identifiers is used for receiving stock price data. The power supply control circuit 180 includes diodes 182 and 186, a field effect transistor (FET) 184 and a resistor. The anode of the diose 186 is connected to the primary battery 112 and the cathode thereof is connected to the cathode of the diode 182 and connected to the constant voltage circuit 282 and the DC/DC converter 284. The FET 184 has the source connected to the power supply 360 of the information processing apparatus 4-1 via the connector 6-1. The gate of the FET 184 is connected to the CPU 162 and receives a switching signal from the CPU 162 to control the operation of FET. The drain of the FET 184 is connected to the anode of the diode 182 whose cathode is connected to the cathode of the diode 184. The resistor is provided between the source and gate of the FET 184.

When the selective call receiver 2-1 is in the ON state, a high frequency signal is received by an antenna 20 and detected by the detector 222 such that it is amplified and demodulated into a digital signal. The digital signal is supplied to a decoder 224. The decoder 224 decodes the digital signal and outputs the decoded result to the CPU 162. The CPU 162 operates based on a program stored in the PROM 166. The CPU 162 receive the decoded result from the decoder 224 and extracts an identifier section and a data section from the decoded result. The CPU 168 reads out the plurality of identifiers from the ID-ROM 168 to compare a received identifier in the identifier section with the plurality of identifiers. If the received identifier is incoincident with any one of the plurality of identifiers, the CPU 164 stores stock price data of the data section in the RAM 164. The stored stock price data is transferred from the RAM 164 to the control section 340 of the information processing apparatus 4-1 through the interface circuit 320 via the connector 6-1. The stock price data is received by the control section 340 and stored in the RAM 342. Then the control section 340 processed the stock price data based on the program stored in the RAM 342 for the processing of stock price data. The processed results are displayed on a display unit 400 and outputted from a speaker 384 through a driver 382 by the control section 340.

Figure 3:
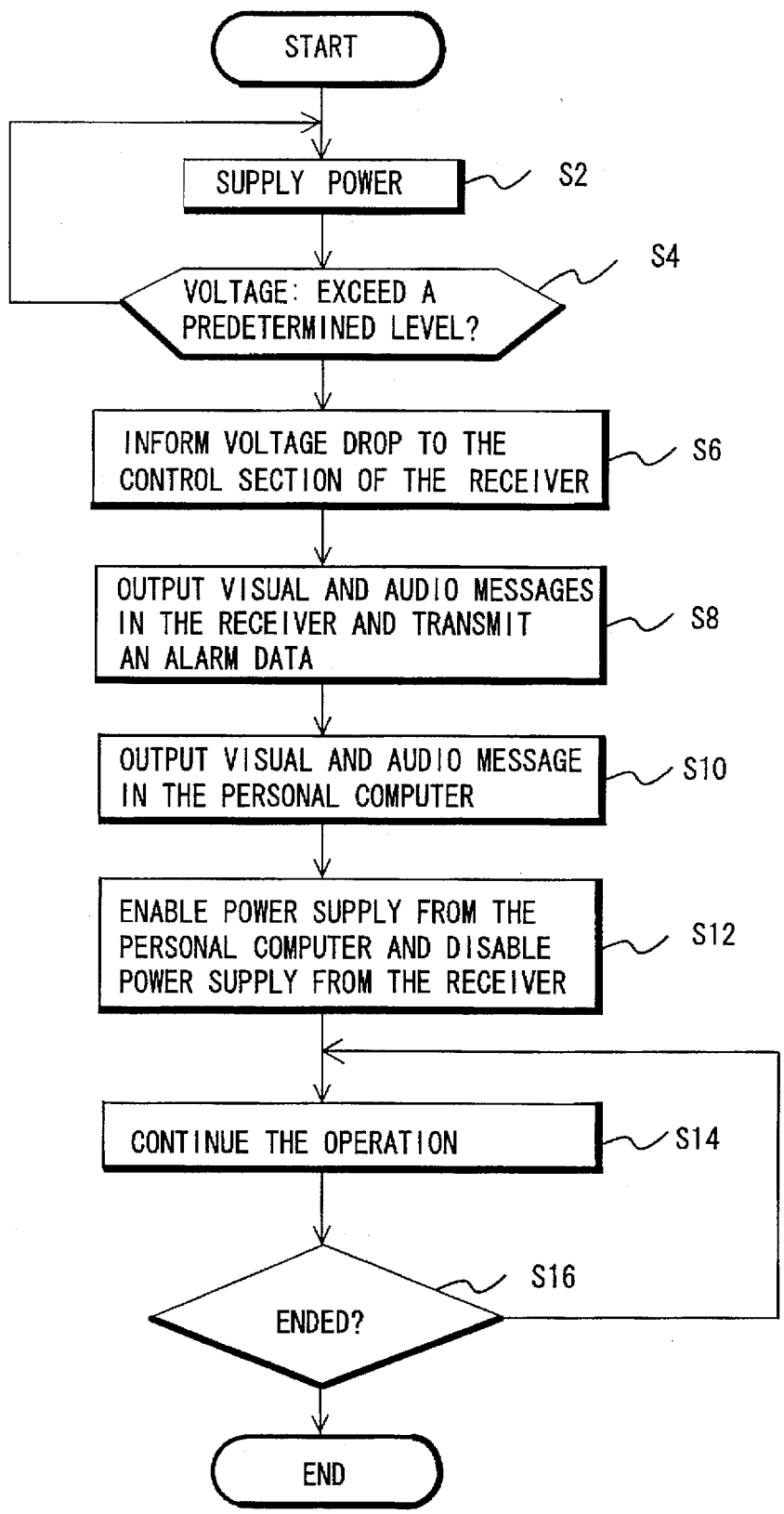
FIG. 3 is a flow chart for explaining the operation of the information processing system according to the embodiment of the present invention.

In the selective call receiver 2-1, the power is usually supplied from the primary battery 112 to the constant voltage circuit 282 and the DC/DC converter 284 through the diode 186 at a step S2, as shown in the flow chart of FIG. 3. While the stock price data is received, the power of the primary battery 112 is input to a voltage detector 142 to be compared with a reference level (for example, about 1.15 V) at a step S4. When it is determined that the output voltage of the primary battery 112 is lower than the reference level, the voltage detector 142 outputs the detecting value as a voltage drop signal to the CPU 162 at a step S6. The CPU 162 first controls the speaker drive circuit 246 to generate information sound informing the voltage drop from the speaker 248 and the display drive circuit 242 to display information indicative of the voltage drop of the primary battery 112 at a step S8. Further, the CPU 162 outputs an alarm data to the control section 340 in the information processing apparatus 4-1 through the I/F circuit 320 via the connector 6-1. In response to the alarm data, the control section 340 controls the display section 400 to display an alarm display indicative of the voltage drop of the primary battery 112 and drives the speaker drive circuit 246 to drive to output alarm information sound from the speaker at a step S10. In addition, the CPU 162 controls the power supply control circuit 180 such that the power from the power supply 360 is supplied to the wireless selective call receiver 2-1 via the connector 6-1 at a step 12. More specifically, the CPU 162 outputs a switching signal to the FET 184. The FET is turned on to enable the power supply 360 and the power is supplied from the power supply 360 through the FET 184 and the diode 182. Since the output voltage is higher than that of the primary battery 112, the diode 186 is reversely biased so that it is turned off to disable the primary battery 112 from supplying the power. Accordingly, the power from the power supply 360 is supplied to the constant voltage circuit 282 and the DC/DC converter 284. As a result, the operation of the selective call receiver 2-1 when the output voltage of the primary battery 112 drops can be guaranteed at a step S14. The operation is continued until the signal indicative of the end of stock price data is received at a step S16.

There is a case where the user wants to check the schedule while the stock price data is transmitted. In such a case, the schedule processing program and a scheduling data are transmitted with a high frequency wireless signal in the same manner as the stock price data. Note that one identifier is used for the stock price data. Accordingly, the schedule processing program and scheduling data are transmitted using another identifier. The program and scheduling data received by the antenna 20 is decoded, extracted and transferred to the information processing apparatus 4-1 and stored in the RAM 342. When the user operates the key board (not shown), the schedule processing program is executed in place of the stock price data processing program and the executed result is displayed on the display unit 400 by the control section 340. Thus, the user can confirm the schedule.

Accordingly, in a case where the primary battery voltage of the selective call receiver 2-1 drops in a state in which the selective call receiver 2-1 is connected to the information processing apparatus 4-1, the alarm data indicative of the voltage drop of the primary battery 112 is transmitted from the selective call receiver 2-1 to the information processing apparatus 4-1. As a result, the information indicative of the voltage drop of the primary battery 112 is presented by the display section 400 or speaker 384 of the information processing apparatus 4-1. Thus, the user can reliably recognize the power supply voltage drop in the receiver 2-1 during use of the information processing apparatus 4-1. Further, it can be prevented that exhaustion of the battery power is not recognized so that a chance of receiving any information is lost. In addition, the reception of information by the selective call receiver 2-1 is not suspended because the power supply control circuit 180 operates to supply the power from the information processing apparatus 4-1 to the selective call receiver 2-1.

What is claimed is:

1. A portable information processing system comprising:
a portable information processing apparatus including a first power supply unit for supplying power for said information processing apparatus, wherein said information processing apparatus processes information transferred thereto, and
a portable selective call receiver connected to said information processing apparatus, for receiving the information to transfer to said information processing apparatus, wherein said selective call receiver comprises:
a second power supply unit for supplying power for said receiver; and
power supply switching means for supplying the power from said first power supply unit for said receiver in place of said second power supply unit when an output voltage of said second power supply unit drops.

2. The portable information processing system according to claim 1, wherein said power supply switching means automatically switches from said second power supply to said first power supply for said receiver without any instantaneous power down when an output voltage of said second power supply drops.

3. The portable information processing system according to claim 2, wherein said power supply switching means comprises:
a first rectifying element having an anode coupled to said second power supply unit; and
a second rectifying element having an anode coupled to said first power supply unit and a cathode coupled to a cathode of said first rectifying element.

4. The portable information processing system according to claim 2, wherein said power supply switching means comprises:
detecting means for detecting that the output voltage of said second power supply unit drops to a predetermined level;
switching control means for generating a switching control signal when it is detected by said detecting means that the output voltage of said second power supply unit drops to the predetermined level; and
switching means for switching from said second power supply to said first power supply for said receiver without any instantaneous power down in response to the switching control signal.

5. The portable information processing system according to claim 1, wherein said selective call receiver further includes outputting means for outputting an alarm data, and wherein said information processing apparatus further includes:
a display unit; and
display control means for displaying a message indicative of the voltage drop of said second power supply unit in response to the alarm data.

6. The portable information processing system according to claim 1, wherein said selective call receiver further includes outputting means for outputting an alarm data, and wherein said information processing apparatus further includes:
a sound output unit; and
sound output control means for outputting an alarm sound indicative of the voltage drop of said second power supply unit in response to the alarm data.

7. The portable information processing system according to claim 1, wherein said selective call receiver includes means for receiving a program and transferring the program to said information processing apparatus, and
wherein said information processing apparatus further comprises means for storing the transferred program to execute the program.

8. The portable information processing system according to claim 1, wherein said information processing apparatus and said selective call receiver are connected to each other via a connector which is compatible with a pocketable small device such as an IC card.

9. In a portable information processing system in which an information processing apparatus and a portable wireless selective call receiver are connected and said information processing apparatus processes or operates based on an information received by said receiver, a method of switching power supply, comprising the steps of:
detecting that the output voltage of a power supply unit built in said receiver drops to a predetermined level; and automatically switching from the power supply unit built in said receiver to another power supply unit built in said information processing apparatus for said receiver in response to the detection.

10. The switching method according to claim 9 wherein said switching step comprises the steps of:

generating a control signal when it is detected that the output voltage of the power supply unit built in said receiver drops to the predetermined level; and switching from the power supply unit built in said receiver to said another power supply unit built in said information processing apparatus without any instantaneous power down in response to the control signal.

11. The switching method according to claim 9, wherein said switching step includes enabling said another power supply unit built in said information processing apparatus for supplying a power to said receiver and concurrently disable the power supply unit built in said receiver.

12. A portable selective call receiver having a connector through which said receiver is connected to an information processing apparatus, and capable of transferring an information received to said information processing apparatus, comprising:

a power supply unit for supplying power for said receiver;

a terminal for receiving an external power; and power supply switching means for connecting the terminal to the information processing apparatus to receive power for said receiver from a power supply of the information processing apparatus in place of said power supply unit when an output voltage of said power supply unit drops.

13. The portable selective call receiver according to claim 12, wherein said power supply switching means automatically switches from said power supply unit to said power supply of said information processing apparatus, without any instantaneous power down, when an output voltage of said power supply unit drops.

14. The portable selective call receiver according to claim 12, wherein said power supply switching means comprises:

a first rectifying element having an anode coupled to said power supply unit; and a second rectifying element having an anode coupled to said terminal and a cathode coupled to a cathode of said first rectifying element.

15. The portable selective call receiver according to claim 12, wherein said power supply switching means comprises:

detecting means for detecting that the output voltage of said power supply unit drops to a predetermined level;

switching control means for generating a switching control signal when it is detected by said detecting means that the output voltage of said power supply unit drops to a predetermined level; and switching means for switching from said power supply unit to said power supply of the information processing apparatus, without any instantaneous power down, in response to the switching control signal.

16. The portable selective call receiver according to claim 15, wherein said switching means includes:

means for enabling the power supply of said information processing apparatus to supply power to said receiver when an output voltage of said power supply unit drops to a predetermined level; and means for disabling the power supply unit at the same time.

17. The portable selective call receiver according to claim 12, wherein said connector is compatible with a pocketable small device such as an IC card.

18. A portable information processing system comprising:

receiving means having a first power supply and having at least one identifier assigned thereto, for selectively receiving a signal using the identifier and extracting an information and/or program from the received signal to transfer the extracted information and/or program;

processing means having a second power supply independent of said first power supply, for processing the information transferred from said receiving means and for executing the program transferred from said receiving means;

power supply switching means for switching a power source for said receiving means from said first power supply to said second power supply to allow the information and/or the program to be continuously received when an output voltage of said first power supply drops.

* * * * *